United States Patent [19]
Ryan

[11] 3,791,499
[45] Feb. 12, 1974

[54] CLUTCH

[76] Inventor: Joseph J. Ryan, 15325 Norton Rd., Saratoga, Calif. 95070

[22] Filed: Jan. 3, 1972

[21] Appl. No.: 214,557

[52] U.S. Cl. ......... 192/70.27, 192/70.25, 192/89 B, 267/162
[51] Int. Cl. ............................................ F16d 13/56
[58] Field of Search... 192/70.2, 70.25, 70.27, 89 B; 188/170, 171, 72.3; 267/162

[56] References Cited
UNITED STATES PATENTS

| 3,171,270 | 3/1965 | Dahlberg | 192/89 B X |
| 3,375,000 | 3/1968 | Seamands et al. | 267/162 |
| 2,009,031 | 7/1935 | Staples | 192/70.25 |
| 2,264,902 | 12/1941 | Hill | 267/162 X |
| 2,939,330 | 6/1960 | Margetts | 64/30 C X |
| 3,127,157 | 3/1964 | Webb | 267/162 |
| 3,319,751 | 5/1967 | Sacchini | 192/70.25 X |

FOREIGN PATENTS OR APPLICATIONS

| 187,788 | 11/1958 | Sweden | 267/162 |
| 1,317,772 | 1/1963 | France | 192/89 B |

Primary Examiner—Allan D. Herrmann

[57] ABSTRACT

A clutch for transferring torque from an input to an output shaft which includes input and output clutch elements connected respectively to said shafts for rotation therewith and spring means for urging said clutch elements together including a pair of spring diaphragms arranged in adjacent relation whereby the summation of their resilient forces is realized.

2 Claims, 4 Drawing Figures

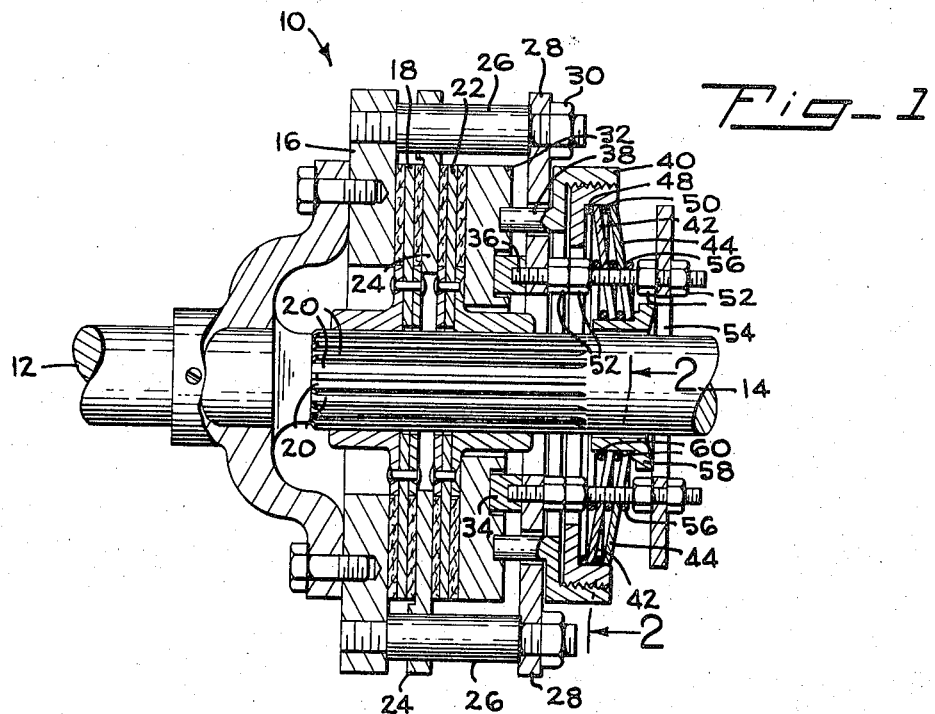
Fig_1
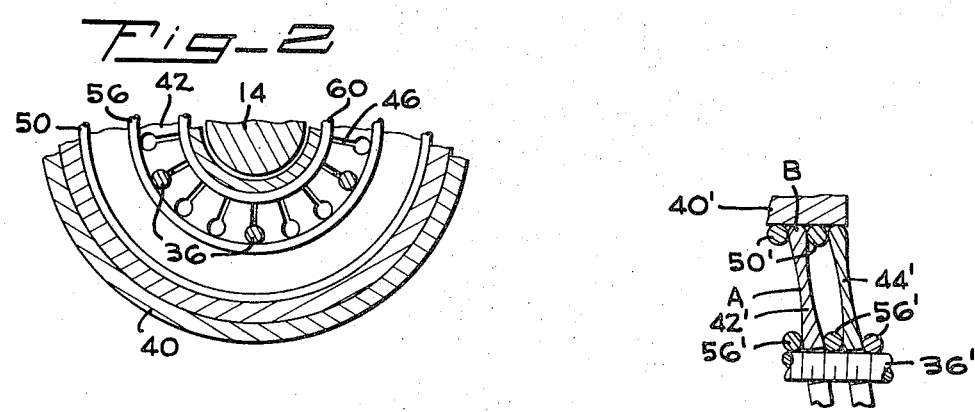
Fig_2
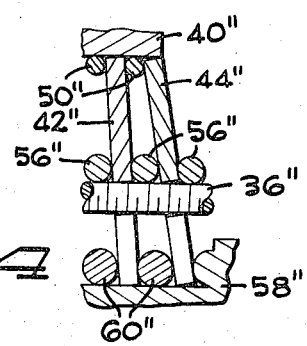
Fig_3
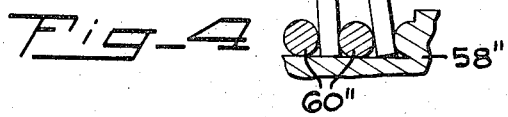
Fig_4

CLUTCH

FIELD OF THE INVENTION

The present invention relates generally to cluch mechanisms, and more particularly, to a clutch mechanism operative to complete the drive train between the engine and drive wheels of an automotive vehicle.

BACKGROUND OF THE INVENTION

A rather wide variety of clutch mechanisms have been incorporated in automotive vehicles to couple the driving torque of the engine to the drive wheels, and with the advent of high horsepower engines, clutch wear and ultimate failure have increased in direct proportion. In particular reference to racing cars at the start of a race, the engine is driven at a relatively high speed (e.g. 6,000 RPM) immediately prior to sudden engagement of the clutch to insure a rapid start wherefore clutch wear and the resultant necessity for frequent clutch replacement has been an extremely severe problem.

In an attempt to meet the requirements for the transmission of high torque, new clutch surfaces or facings with a high coefficient of friction have been designed and attempts have been made to increase the forces between the input and output clutch elements to enhance the frictional coupling by the use of spring diaphragms. As conventionally utilized, the spring diaphragm is arranged in an annular dished configuration so that its outer periphery engages one of the clutch members and the diaphragm is supported at an intermediate fulcrum position so that the outer periphery is stressed to provide the resilient clutch-engaging force. The inner periphery of the diaphragm is engaged by a throw-out bearing mechanically connected to a clutch pedal enabling release of clutch engagement by flexure of the diaphragm about its fulcrum support. In the case of large, high-powered trucks, relatively thick and large diameter spring diaphragms have been utilized to provide great clutch forces and maximum leverage for clutch release. While these large diameters (e.g. 20 inches) may be accommodated on large trucks, such diameters cannot be readily accommodated on relatively small passenger vehicles or yet smaller racing cars. In addition to the practical space limitation, if a larger diameter spring diaphragm is utilized, at high rotary speeds, centrifugal forces tend to straighten the disposition of the diaphragm from its dished clutch-engaging position and thus reduce the actual clutch pressure or force. In particular, shifting time is increased since the time for establishing full clutch engagement is increased. This in turn allows clutch slippage and results in greatly increased wear.

If, on the other hand, the diameter of the spring diaphragm is retained at an acceptable smaller dimension of approximately 6 to 8 inches, and the central fulcrum position on the diaphragm is set so that increased peripheral spring pressure or force is established to hold the clutch elements in engagement, it then becomes necessary for the throw-out bearing which engages the inner periphery of the annular diaphragm spring to travel further before the clutch is disengaged. In practice, the elastic limits of the spring material have been exceeded so that even if the diaphragm were made of heavier material, failure or actual fracture of the diaphragm is to be expected and has occured in experimental trials.

SUMMARY OF THE PRESENT INVENTION

Accordingly, it is the general objective of the present invention to provide a clutch mechanism which employs two or more spring diaphragms arranged in a cooperative fashion so that greatly increased clutch forces are realized and furthermore can be rapidly established without substantially increasing the overall size of the clutch mechanism or exceeding the elastic limits of the spring diaphragm material. The improved arrangement can be incorporated with but slight modification of conventional diaphragm clutch mechanisms and generally will include a flywheel connected in a more or less standard fashion to an input shaft which may be the crankshaft of an automotive vehicle. An output shaft is axially aligned with the input shaft and is provided with a plurality of axially-extending grooves or keyways to which are keyed one or more clutch members which accordingly rotate with the output shaft but can shift axially with respect thereto. One of the clutch members is arranged to engage the flywheel and any additional clutch members are in turn arranged to engage interposed members that are axially shiftable with respect to the flywheel, but are secured for rotation therewith. In order to rapidly press the clutch members into high-pressure clutch-engaging relationship with the flywheel or the mentioned interposed members connected for rotation therewith, at least two similar diaphragms are employed, the outer peripheries of the diaphragms which have similar dished configurations in their unstressed conditions being operatively arranged to urge the clutch members into engagement with the flywheel or the associated members in response to flexure about one or more circular fulcrum members which contact the diaphragms at positions spaced inwardly from the outer peripheries thereof. Thus, the clutch is held in engagement by the supplementary forces of the plurality of diaphragms so that a relatively high degree of pressure or force enhancing the frictional engagement of the clutch elements is achieved. However, in accordance with an additional aspect of the present invention, the spring diaphragms are held in axially-spaced positions by interposed rings both at their outer peripheries, at the central fulcrum positions and finally at their inner peripheries so that a throw-out bearing of generally conventional nature can be axially shifted along the output shaft to cause flexure of the diaphragms about the intermediate fulcrum positions so as to enable release of the clutch elements. The amount of flexure to achieve such release is no greater than that required to release the pressure of a single diaphragm although the total force required for such action will of course be increased. However, because the disphragms are held in spaced positions, there is no direct contact therebetween and any frictional resistance therebetween during flexure is accordingly obviated. Even though much greater clutch engaging forces can be developed, it is apparent that standard spring diaphragms can be utilized and can be arranged in but slightly spaced positions so that the overall dimensions of the entire clutch assembly are but slightly increased over a clutch employing but a single spring diaphragm.

Certain additional features such as improved torque transfer means and adjustments for wear of the faces of the clutch members are incorporated, and certain modifications of a standard d spring diaphragm structure can also be incorporated to enhance the complementary action of the plurality of diaphragms as will be described in detail hereinafter.

BRIEF DESCRIPTION OF THE DRAWINGS

The stated objective of the invention and the manner in which it is achieved as summarized hereinabove will be more readily understood by reference to the following detailed description of the exemplary structures shown in the accompanying drawing wherein:

FIG. 1 is a central fragmentary sectional view of a clutch mechanism embodying the present invention, FIG. 2 is a fragmentary transverse sectional view taken along line 2—2 of FIG. 1 illustrating details of the clutch-energizing diaphragm arrangement, FIGS. 3 and 4 are fragmentary views illustrating certain modifications of the diaphragm configuration in accordance with additional aspects of the present invention.

DETAILED DESCRIPTION OF THE EXEMPLARY EMBODIMENTS OF THE INVENTION

With initial reference to FIG. 1, a clutch mechanism generally indicated at 10 is arranged to transfer torque from an input shaft 12 to an axially aligned output shaft 14 and, as illustrated, includes a flywheel 16 which is attached to the extremity of the input shaft and is preferably formed in two bolt-connected sections one of which is a bell-shaped member whose annular interior is secured to the input shaft 12 and whose exterior is bolted to an annular plate that forms the input element of the clutch and can be replaced, if necessary by the loosening of the bolts. Because of the configuration of the flywheel 16 and particularly the bell-shaped section thereof, the annular plate is positioned in encompassing relationship around the end of the output shaft 14 wherefore one clutch member 18 also of annular configuration can lie immediately axially adjacent the flywheel plate. The interior hub portion of the clutch member 18 is grooved for meshing contact with a plurality of circumferentially spaced and axially extending keyways 20 on the output shaft 14 so that although the clutch member is thus constrained to rotate with the output shaft and constitutes an output clutch element, it is capable of axial sliding motion along the shaft so that the left clutch-engaging face thereof, as shown in FIG. 1, can be in pressed frictional contacting relationship with the side of the flywheel plate.

While but a single clutch member can be utilized, in the illustrated embodiment of the invention, a second and similar clutch member 22 is also mounted on the keyed end of the output shaft 14 in axially spaced relation with the first clutch member and an annular transfer plate 24 is interposed between the two clutch members and is supported for slidable axial shifting motion on a plurality of circumferentially-spaced dowel pins 26 that are of hollow cylindrical configuration and are supported between the flywheel plate and another annular support plate 28 disposed on the opposite side of the described clutch members 18, 22 by suitable bolts that pass through the hollow dowel pins 26 and are received in aligned threaded openings in the two plates, a lock nut 30 being attached to the extremity of each bolt to hold the two plates in their connected spaced relationship so that both rotate as a unit around the clutch members interposed therebeween when the latter are out of engagement.

To the right of the second clutch member 22, an annular pressure plate 32 is positioned and is tied to the rotary annular support plate 28 by short dowels 34 mounted on studs 36 which are secured in threaded engagement in circumferentially spaced bores in the support plate 28 at radially intermediate positions. The dowels 34 enter aligned sockets in the pressure plate 32 so as to enable transfer of torque, but are axially slidable in such sockets to permit motion of the pressure plate into and out of clutching engagement with the adjacent clutch member 22.

To provide clutch engagement, the pressure plate 32 is connected by a plurality of circumferentially-spaced pins 38 to a diaphragm retaining ring 40 that is engaged by a pair of spring diaphragms 42, 44 as will be described in detail hereinafter so as to be urged to the left, as viewed in FIG. 1, wherefore the second clutch member 22 is forcibly pressed against the interposed transfer plate 24 which is, in turn, urged to the left against the first clutch member 18 which results in pressed engagement of the first clutch member 18 when the flywheel 16 whereby torque may be transmitted from the input to the output shaft. Spaced openings in the support plate 28 slidably encompass the pins 38.

The described retaining ring 40 is generally of L-shaped cross-section so as to both laterally and circumferentially encompass the mentioned pair of spring diaphragms 42, 44. These spring diaphragms 42, 44 are of substantially identical annular configuration, and as best shown in FIG. 2, include an annular outer peripheral portion from which a plurality of slots 46 extend radially inward to form a plurality of fingers extending to the inner periphery thereof. A circular spacer ring 48 is disposed between the outer periphery of the first diaphragm 42 and the axially-adjacent portion of the diaphragm retaining ring 40 and a similar circular spacer ring 50 is disposed between the two diaphragms thus to maintain the two in spaced relationship, but to enable any axial force of the first diaphragm to be directly supplemented by that of the second diaphragm. As in the normal fashion, both spring diaphragms have a natural unflexed dished configuration and the desired forces at the outer perimeters thereof are developed by the adjusted disposition of nuts 52 on the described studs 36 that extend through the radial openings in the diaphragms 42, 44 from their threaded connection with the circumferentially spaced bores of the described annular support plate 28 through aligned bores in another annular plate 54 to the right of the diaphragms as viewed in FIG. 1. Three circular spacer rings 56 are positioned between nuts 52 and the diaphragms 42 44 wherefore by appropriate adjustment of the nuts, desired flexure of the spring diaphragms is achieved and the generated force is transmitted through their perimetral portions to the retaining ring 40 and the pressure plate 32 to provide the clutch engaging force. The circular spacer rings 50, 56 serve to maintain the two spring diaphragms 42 44 in substantially parallel spaced relationship so that during any flexure thereof, the forces of the two diaphragms may supplement one another but there are no frictional sliding forces of any consequence therebetween which would otherwise interfere with the full force being developed.

In order to release the spring forces thus to provide clutch disengagement, the end of a throw-out bearing, indicated at 58 which may generally be of conventioanl nature and forms no part of the present invention, is arranged to engage through spacer rings 60 the inner perimeters of the diaphragms 42, 44 and if sufficient force moves the bearing to the left, as viewed in FIG. 1, the spring diaphragms will pivot about the central spacer rings 56 which function as fulcrums to cause the outer extremities of the spring diaphragms, which engage the retainer ring 40 and thus the pressure plate 28 through the attached pins 38 to move in the opposite axial direction to relieve the clutch-engaging forces, thus disconnecting the transfer of torque from the input to the output shaft. While the amount of force required to cause flexure of the diaphragms 42, 44 is increased because of their supplemental action, the distance the throw-out bearing 58 must move to release engagement of the clutch is no greater than if a single diaphragm were used, and because of the interconnection of the two diaphragms by the spacer rings, no greater stress on the spring diaphragms is experienced than would be the case if but a single diaphragm were utilized.

Preferably to provide accommodation for wear of the clutch, the mentioned retaining ring 40 is made in two sections one of which is exteriorly threaded and the other of which is interiorly threaded so that relative turning of the outer section will cause axial diaplacement or adjustment of the two, thus to ultimately effect axial displacement of the pressure plate 28 in a very simple fashion and allow accommodation for clutch wear, as desired.

In practice, the clutch as described has been utilized with special diaphragms having a thickness of 0.090 inch and a diameter of approximately 6 inches. When used with standard clutch members whose diameters are approximately 8 inches on a racing car having an engine of 500 horsepower, the clutch has neither failed nor been replaced over a period including 50 races each of which extended over a 20 mile distance and on an average required 20 clutch releases. During this period, no clutch adjustment was required and it is notable that three engine replacements were made.

While the spring diaphragms shown in FIGS. 1 and 2 are of conventional configuration and can be used with effectiveness in their cooperative functioning as illustrated, yet further enhancement of the cooperative effort of a multiplicity of diaphragms can be achieved with but slight modification thereof. By way of example, initial reference is made to FIG. 3 wherein the outer extremity of the diaphragms 42', 44' are thinned near their outer edges as indicated at A and are rounded at their extremities as indicated at B to provide greater flexing yet increased edge strength at the high rotative speeds.

As a second alternative, the disphragms 42", 44" as shown in FIG. 4 have interposed spacer rings 50", 56", 60" of different diameters so that a non-parallel diaphragm disposition is attained so that the leverage of the two is varied. By appropriate choice of spacer ring size, any desired complementary force summation can be achieved.

Various other modifications and/or alternations can be made without departing from the spirit of the invention and the foregoing description of several embodiments is accordingly not to be construed in a limiting sense. The actual scope of the invention is to be indicated only by the appended claims.

What is claimed is:

1. Clutch mechanism operable to connect an input shaft to an output shaft
    which comprises an input clutch element connected to said input shaft for rotation therewith,
    an output clutch member keyed to said output shaft and shiftable axially thereof into clutching engagement with said input clutch element, and
    spring means for resiliently urging said clutch member against said input clutch element including first and second spring diaphragms arranged so that the resilient forces thereof are additive,
    said spring means including a retaining ring engaging the outer peripheries of said diaphragms, and
    a pressure plate connected to said retaining ring and axially movable into pressure contact with said clutch member, and
    said retaining ring being formed by two axially-adjustable sections enabling accommodation for clutch wear.

2. Clutch mechanism operable to connect an input shaft to an output shaft
    which comprises an input clutch element connected to said input shaft for rotation therewith,
    an output clutch member keyed to said output shaft and shiftable axially thereof into clutching engagement with said input clutch element, and
    spring means for resiliently urging said clutch member against said input clutch element including first and second spring diaphragms arranged so that the resilient forces thereof are additive,
    said spring means including a retaining ring engaging the outer peripheries of said diaphragms, and
    a pressure plate connected to said retaining ring and axially movable into pressure contact with said clutch member, and
    a plurality of dowels connected to said input clutch element and arranged for close slidable driving reception in sockets in said pressure plate.

* * * * *